(12) United States Patent
Zanetti et al.

(10) Patent No.: US 11,573,385 B1
(45) Date of Patent: Feb. 7, 2023

(54) MULTIMEDIA CONNECTOR CABLE

(71) Applicants: Luca Zanetti, Orlando, FL (US); Silvia Fioravanti, Orlando, FL (US)

(72) Inventors: Luca Zanetti, Orlando, FL (US); Silvia Fioravanti, Orlando, FL (US)

( * ) Notice: Subject to any disclaimer, the term of this patent is extended or adjusted under 35 U.S.C. 154(b) by 0 days.

(21) Appl. No.: 17/666,292

(22) Filed: Feb. 7, 2022

Related U.S. Application Data

(63) Continuation-in-part of application No. 17/224,644, filed on Apr. 7, 2021, now Pat. No. 11,320,599.

(51) Int. Cl.
*G02B 6/42* (2006.01)
*H01R 31/02* (2006.01)
*G02B 6/38* (2006.01)

(52) U.S. Cl.
CPC ......... *G02B 6/4278* (2013.01); *G02B 6/3893* (2013.01); *H01R 31/02* (2013.01)

(58) Field of Classification Search
CPC ....... G02B 6/4278; G02B 6/3893; H01R 3/02
See application file for complete search history.

(56) References Cited

U.S. PATENT DOCUMENTS

| | | | | |
|---|---|---|---|---|
| 5,920,560 A * | 7/1999 | Takahashi | ............. | H04L 49/255 370/395.32 |
| 6,141,719 A * | 10/2000 | Rafferty | ............. | G06F 13/4022 710/316 |
| 6,404,747 B1 * | 6/2002 | Berry | ...................... | H04M 3/51 379/265.09 |
| 6,411,936 B1 * | 6/2002 | Sanders | ............. | G06Q 10/0639 705/7.29 |
| 7,113,200 B2 * | 9/2006 | Eshkoli | .................. | H04N 7/147 348/14.09 |
| 7,535,485 B2 * | 5/2009 | Elbaz | ................. | H04N 21/2662 348/14.08 |
| 7,596,186 B2 * | 9/2009 | Le Bars | ................ | H04L 27/362 342/353 |
| 7,787,007 B2 * | 8/2010 | Eshkoli | .................. | H04N 7/152 348/556 |
| 8,223,191 B2 * | 7/2012 | Elbaz | ................. | H04N 21/2662 348/14.09 |
| 8,287,299 B2 * | 10/2012 | Ray | ..................... | H01R 13/6273 439/353 |
| 8,456,504 B2 * | 6/2013 | Eshkoli | .................. | H04N 7/147 348/14.09 |
| 8,457,153 B2 * | 6/2013 | Nguyen | ................. | G09G 5/006 370/464 |
| 8,562,226 B2 * | 10/2013 | Schmidt | ................ | H04B 10/50 385/92 |
| 9,011,022 B2 * | 4/2015 | Ko | ....................... | G02B 6/3817 385/88 |
| 9,673,587 B2 * | 6/2017 | Pechter | ................. | H01R 43/20 |
| 9,837,778 B2 * | 12/2017 | Pechter | ................. | H01R 43/28 |
| 9,971,115 B2 * | 5/2018 | Jiang | ..................... | G02B 6/4416 |
| 10,057,307 B2 * | 8/2018 | Jacquemot | ............ | H04L 65/403 |
| 10,241,283 B1 * | 3/2019 | Shen | .................. | H04B 10/2589 |

(Continued)

*Primary Examiner* — Peter Radkowski
(74) *Attorney, Agent, or Firm* — Barry Choobin; Patent 360

(57) ABSTRACT

A multimedia connector cable having a cable encasing a plurality of optical fibers. The cable having a proximal end and a distal end. The proximal end having an electrical connector in optical communication with the plurality of optical fibers. The distal end having an optical connector in optical communication with the plurality of optical fibers.

14 Claims, 18 Drawing Sheets

(56) References Cited

U.S. PATENT DOCUMENTS

| | | | | |
|---|---|---|---|---|
| 10,587,341 B2* | 3/2020 | Nakayama | | G02B 6/4284 |
| 10,868,624 B2* | 12/2020 | Shintani | | G02B 6/4416 |
| 11,320,599 B2* | 5/2022 | Zanetti | | G06F 13/382 |
| 2004/0042553 A1* | 3/2004 | Elbaz | | H04N 19/176 |
| | | | | 375/E7.176 |
| 2005/0259144 A1* | 11/2005 | Eshkoli | | H04N 7/147 |
| | | | | 348/14.07 |
| 2006/0056278 A1* | 3/2006 | Le Bars | | H04L 27/38 |
| | | | | 370/204 |
| 2006/0274195 A1* | 12/2006 | Eshkoli | | G06F 3/1454 |
| | | | | 348/556 |
| 2007/0237462 A1* | 10/2007 | Aronson | | G02B 6/4292 |
| | | | | 385/89 |
| 2009/0284581 A1* | 11/2009 | Elbaz | | H04N 21/2662 |
| | | | | 348/14.12 |
| 2011/0007126 A1* | 1/2011 | Eshkoli | | H04N 7/147 |
| | | | | 348/E7.078 |
| 2011/0255827 A1* | 10/2011 | Schmidt | | G02B 6/4201 |
| | | | | 29/874 |
| 2011/0316962 A1* | 12/2011 | Doi | | H04N 21/43635 |
| | | | | 348/14.01 |
| 2012/0023267 A1* | 1/2012 | Sasaki | | H04N 5/765 |
| | | | | 710/14 |
| 2012/0249871 A1* | 10/2012 | Nguyen | | H04N 7/102 |
| | | | | 348/E7.003 |
| 2013/0109317 A1* | 5/2013 | Kikuchi | | H01P 5/087 |
| | | | | 455/41.2 |
| 2016/0020858 A1* | 1/2016 | Sipes, Jr. | | H04B 10/272 |
| | | | | 398/116 |
| 2016/0285221 A1* | 9/2016 | Pechter | | H01R 43/20 |
| 2016/0306127 A1* | 10/2016 | Jiang | | G02B 6/4245 |
| 2017/0250514 A1* | 8/2017 | Pechter | | H01R 43/20 |
| 2019/0013889 A1* | 1/2019 | Shintani | | H04N 7/102 |
| 2019/0253144 A1* | 8/2019 | Nakayama | | H04B 10/50 |
| 2019/0335139 A1* | 10/2019 | Nishio | | H04N 7/104 |
| 2020/0295846 A1* | 9/2020 | Bai | | G02B 6/4284 |
| 2021/0223482 A1* | 7/2021 | Zanetti | | H01R 13/502 |

* cited by examiner

MULTIMEDIA CONNECTOR CABLE

CROSS-REFERENCE TO RELATED APPLICATIONS

This application is a continuation-in-part of a U.S. patent application Ser. No. 17/224,644 filed on Apr. 7, 2021, which claims priority from a U.S. provisional patent application Ser. No. 63/138,211, filed on Jan. 15, 2021, both of which are incorporated herein by reference in its entirety.

FIELD OF INVENTION

The present invention relates to a multimedia cable, and more particularly the present invention relates to a multimedia connector cable.

BACKGROUND

HDMI active optical cables (HDMI AOC) are known in the art that allows extending cable lengths to several feet without compromising the quality. The optical fibers in the HDMI active optical cables can carry high bandwidth data up to several feet of cable lengths. The long HDMI active optical cables can be wired behind the walls to provide connectivity between the source device and target device.

However, the known HDMI AOC suffers from two major drawbacks. First, the connector of the cable can break easily leaving the entire cable useless. Replacing the whole cable running behind the walls can be labor-intensive, hectic, and expensive. Generally, a limited number of connectors are available in the multimedia devices and the connector must be unplugged and plugged multiple times to switch between devices. For example, it is common for the children playing rough video games to plug and unplug the cables multiple times which may damage the connectors.

Second, technology is upgrading every day, for example, 4K video is standard nowadays while 8K can be near future, and 12K video data transfer will be feasible in future. It is not desired that a user replaces complete wiring in a building to upgrade to future technologies.

Thus, a desire is there for a multimedia connector cable that overcomes the aforesaid drawbacks of known HDMI AOC cables.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a multimedia connector cable that can be replaced without changing the wiring behind the walls.

It is another object of the present invention that multimedia connector cable can be future-ready.

It is still another object of the present invention that the multimedia connector cable does not impact the quality of the multimedia transfer.

It is a further object of the present invention that the multimedia connector cable is economical to manufacture.

In one aspect, the disclosed multimedia connector cable having a cable encasing a plurality of optical fibers. The cable having a proximal end and a distal end. The proximal end having an electrical connector in optical communication with the plurality of optical fibers. The distal end having an optical connector in optical communication with the plurality of optical fibers.

In one aspect, the electrical connector is having a transmitter circuitry for converting electrical signals to light signals for transmitting through the plurality of optical fibers. The electrical connector can have an interface such as an HDMI, USB, DVI, Display Port, SDI, and the like multimedia interfaces. The USB interface can be any of the known USB interfaces for high bandwidth data transfer, such as USB-C.

In one aspect, the disclosed electrical connector can have a receiving circuitry for converting the light signals to electrical signals. The receiving circuitry can be powered externally, for example using a USB interface cable.

In one aspect, the optical connector can be an LC connector or an MPO connector. The optical connector can have a male interface or a female interface. The other part of the optical connector (mating optical connector) can connect to the longer optical cable.

These and other objects and advantages of the embodiments herein and the summary will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
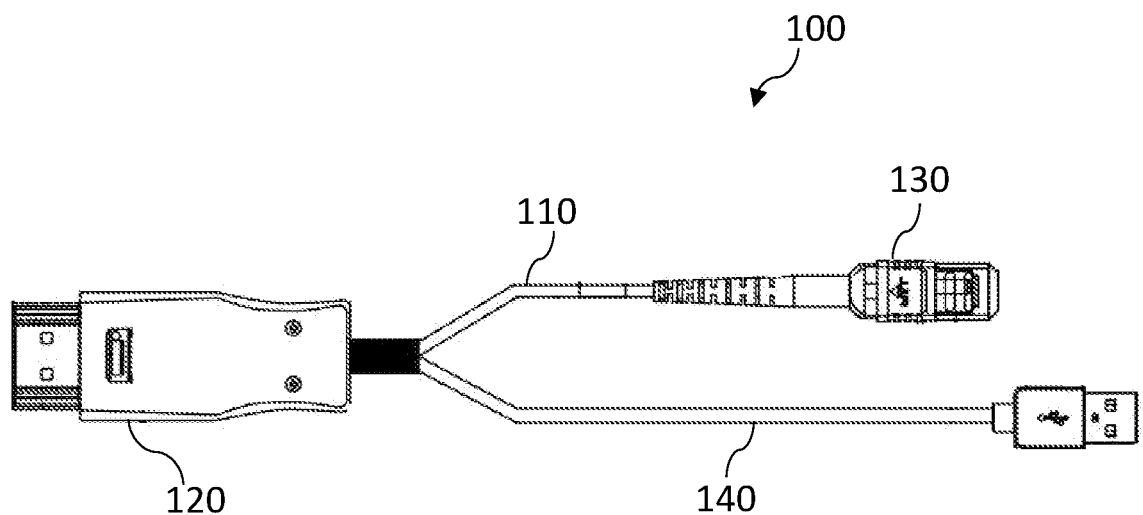
FIG. 1 shows the multimedia connector cable for the target device has an HDMI interface and USB cable for the power supply, according to an exemplary embodiment of the present invention.

Disclosed is a multimedia optical connector for high bandwidth data transfer through optical cables. Referring to FIG. 1, which shows an exemplary embodiment of the multimedia connector cable 100. The multimedia connector cable 100 having an optical cable 110 which can have a plurality of optical fibers ranging from 2-24 optical fibers. The optical connector cable having a proximal end and a distal end. The proximal end having an electrical connector 120 while the distal end can have an optical connector 130. The optical connector can be an MPO (Multi-fiber push-on) connector. The MPO connector can have a male interface or a female interface, wherein the male interface connector can intermate with a female interface optical connector. The corresponding female interface optical connector can be on a longer optical cable. Similarly, in case the optical connector 130 is having a female interface, the mating optical connector can be having a male interface. The longer optical cable can be wired in the walls running several feet for connecting the source device to the target device. The source device can be a multimedia player, CPU unit, and like. The target device can be a display, projector, and like. The mating optical connectors of the long optical cable can be installed in a wall switchboard and like. The long optical cable can be of a length up to 500 feet.

The electrical connector can have an interface for electrically connecting to the source device or the target device. FIG. 1 shows the electrical connector 120 having an HDMI interface. Depending on whether the electrical connector is for the source device or target device, the electrical connector can have a transmitting circuitry or a receiving circuitry. The transmitting circuitry can convert the electrical signals to the light signals for transmitting through the plurality of optical fibers encased in the optical cable. The receiving circuitry can convert the light signals received through the optical fibers to the electrical signals. The electrical signals can then be transmitting to the target device. The transmitting circuitry can be powered by the source device or can be externally powered. Similarly, the receiving circuitry can be powered by the target device or can be powered externally. Generally, the receiving circuitry is powered externally while the transmitting circuitry can be powered by the source device.

FIG. 1 shows the multimedia connector cable 100 for the target device having the receiving circuitry. There is an extra USB cable 140 extending from the electrical connector 120 which is a USB cable and can be used to power the receiving circuitry.

Figure 2:
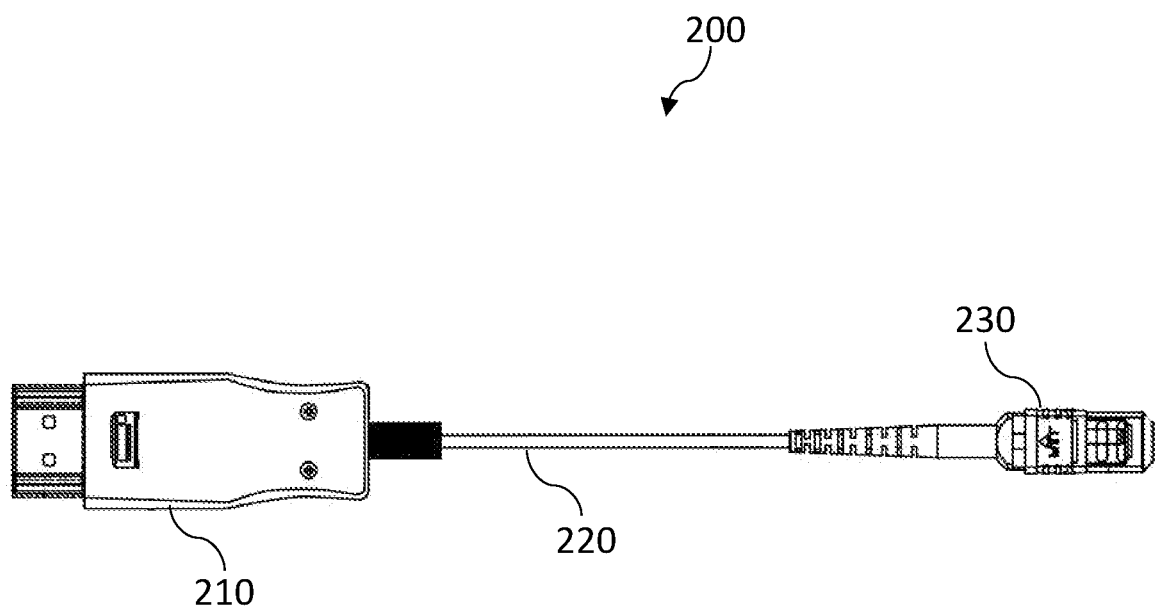
FIG. 2 is the multimedia connector cable for the source device having an HDMI interface, according to an exemplary embodiment of the present invention.

FIG. 2 shows the multimedia connector cable 200 for the source device. The multimedia connector cable 200 is also having an electrical connector 210 connected to the optical cable 220 which on its opposite end can have the optical connector 230. The electrical connector 210 can have the transmitting circuitry for converting the electrical signals from the source device into the light signals for transmitting through the optical cable 220. The transmitting circuitry can be powered by the source device itself.

Figure 3:
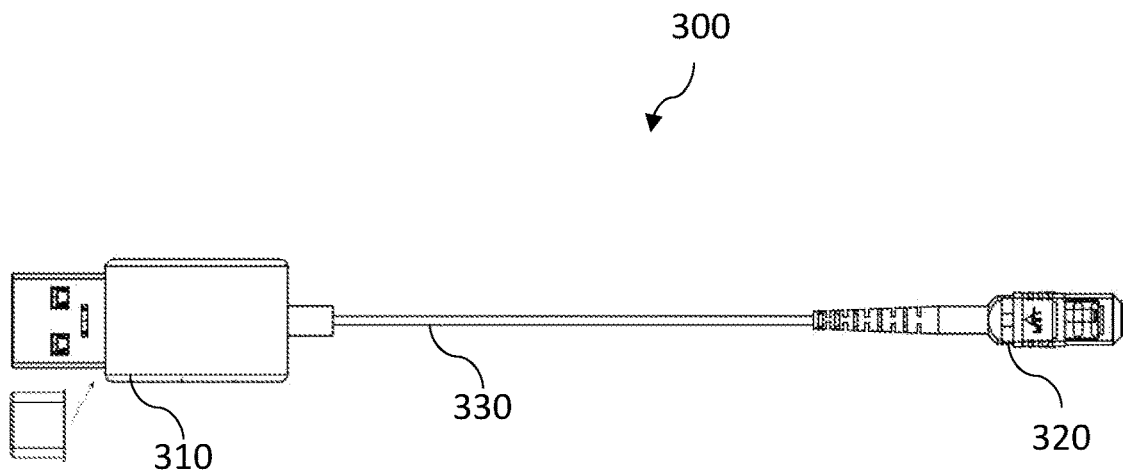
FIG. 3 is another exemplary embodiment of the multimedia connector cable for the target device having a hi-speed USB interface and USB cable for power supply, according to an exemplary embodiment of the present invention.
Figure 4:
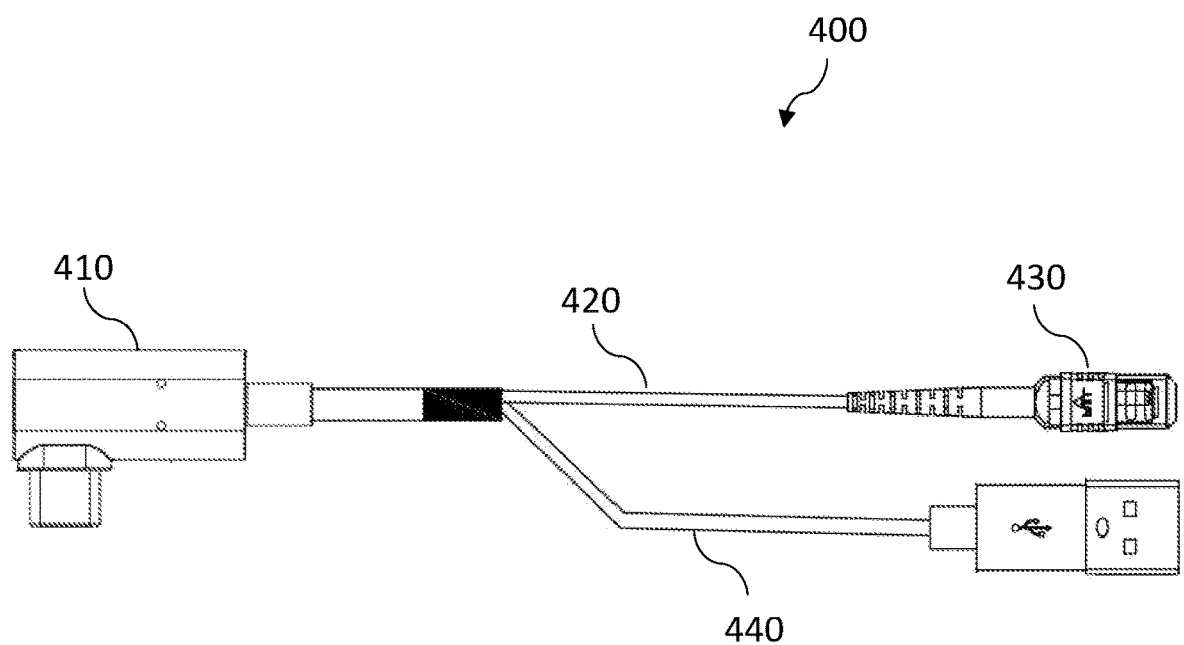
FIG. 4 is the multimedia connector cable for the source device having the hi-speed USB interface, according to an exemplary embodiment of the present invention.
Figure 5A:
FIG. 5A is an electrical connector with a transmitting circuitry and FIG. 5B is an electrical connector with a receiving circuitry, according to an exemplary embodiment of the present invention.
Figure 5B:
Figures 6A, 6B:
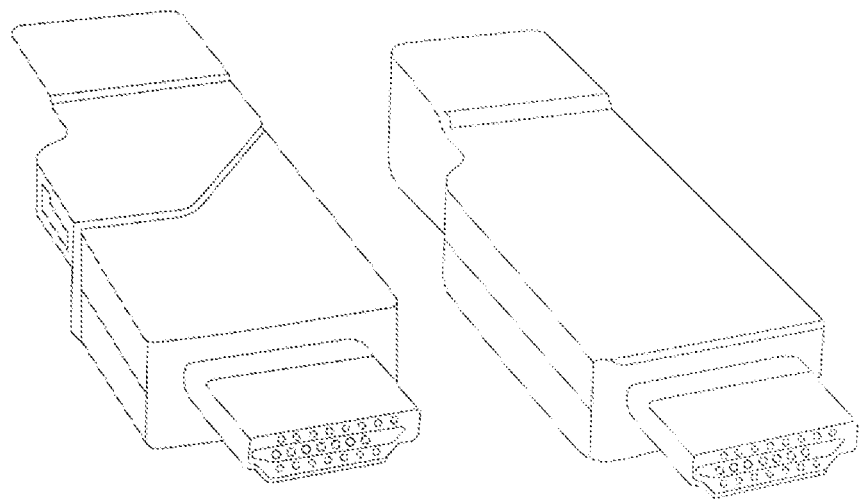
FIG. 6A is an electrical connector with a transmitting circuitry and FIG. 6B is an electrical connector with a receiving circuitry, wherein both the electrical connectors have a digital video interface, according to an exemplary embodiment of the present invention.
Figure 7A:
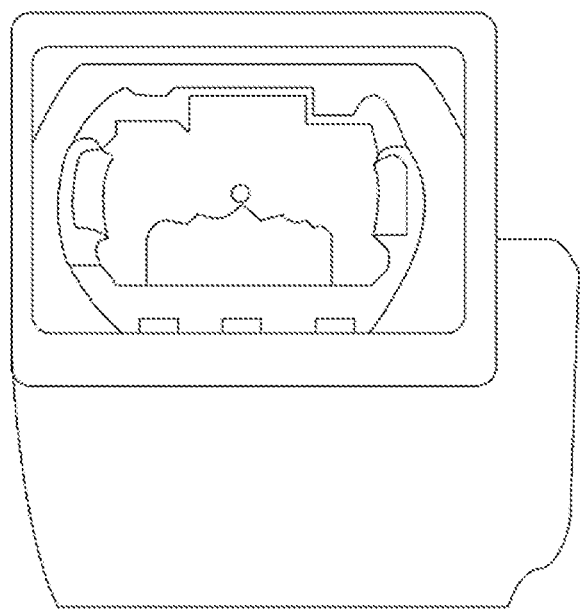
FIG. 7A is an electrical connector with a transmitting circuitry and FIG. 7B is an electrical connector with a receiving circuitry, according to an exemplary embodiment of the present invention
Figure 7B:
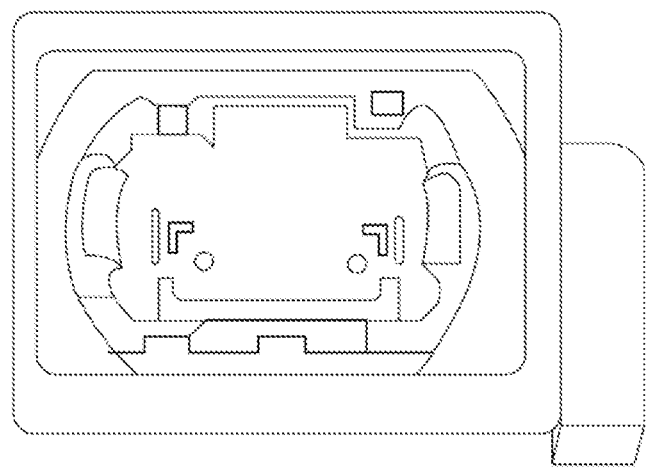
Figure 8A:
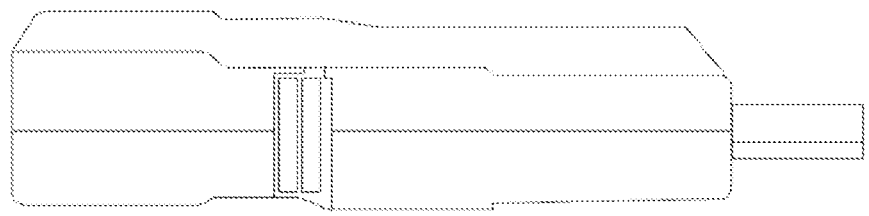
FIG. 8A is an electrical connector with a transmitting circuitry and FIG. 8B is an electrical connector with a receiving circuitry further having a port for USB, wherein both the electrical connectors have an HDMI interface, according to an exemplary embodiment of the present invention.
Figure 8B:
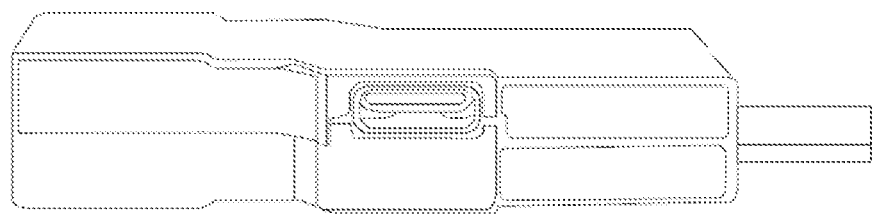
Figure 9:
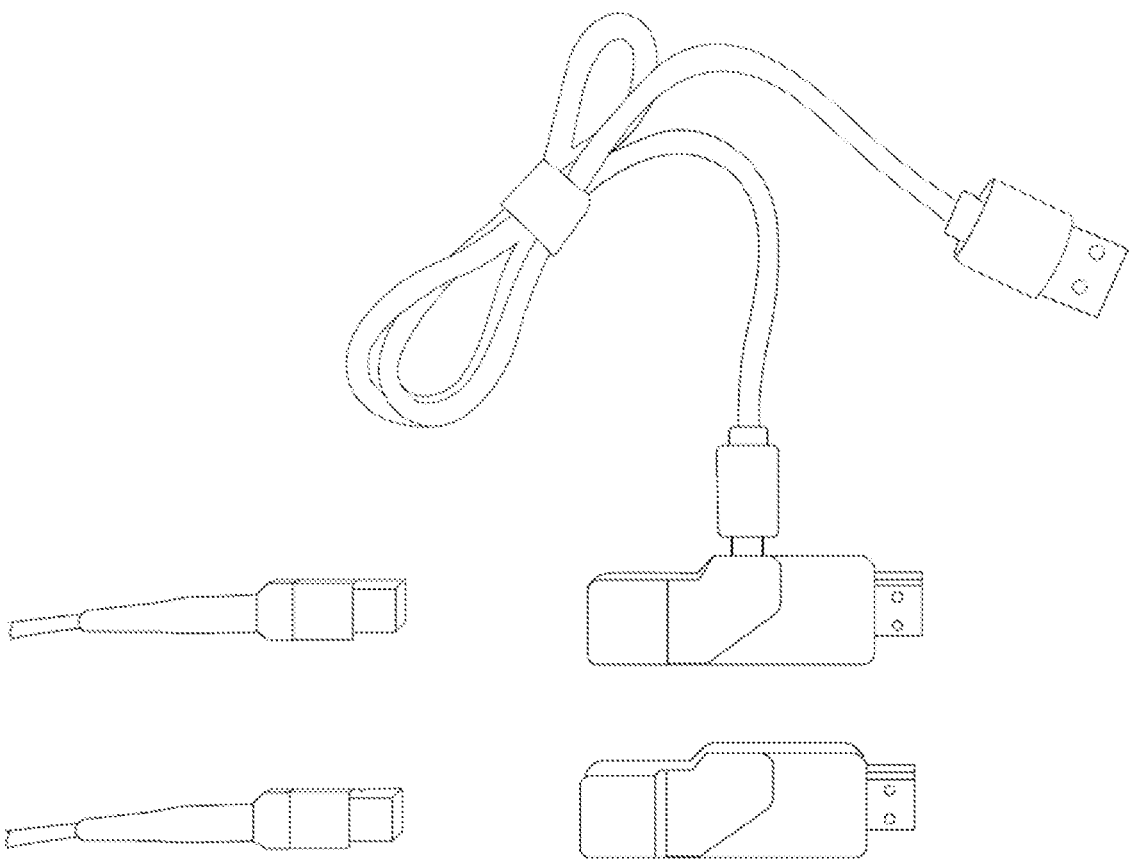
FIG. 9 shows the two electrical connectors shown in FIGS. 8A and 8B, and a USB cable connected to the electrical connector with a receiving circuitry and optical connectors, according to an exemplary embodiment of the present invention.
Figure 10:
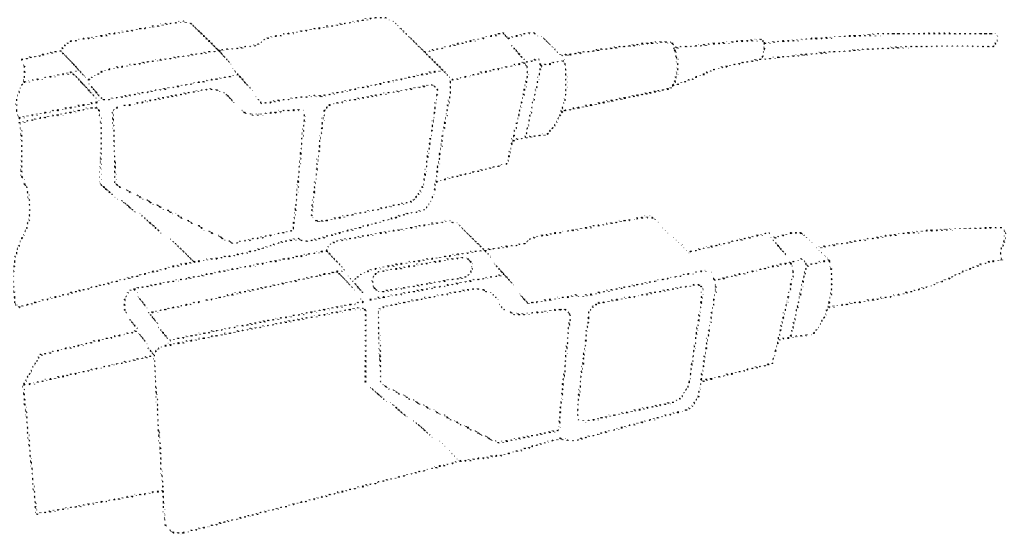
FIG. 10 shows two views of an optical connector, according to an exemplary embodiment of the present invention.
Figure 11:
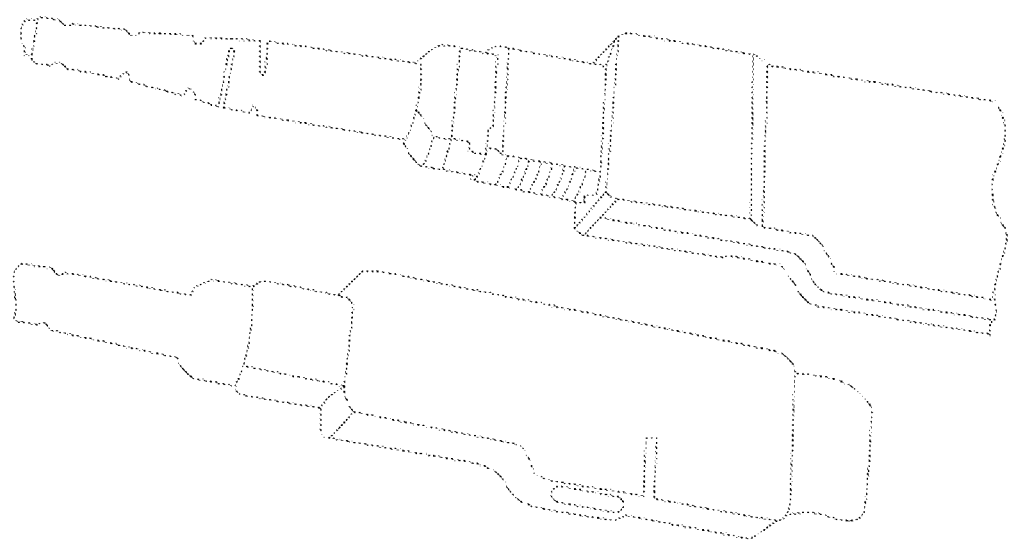
FIG. 11 shows an electrical connector and an optical connector of a multimedia connector cable, according to an exemplary embodiment of the present invention.
Figure 12:
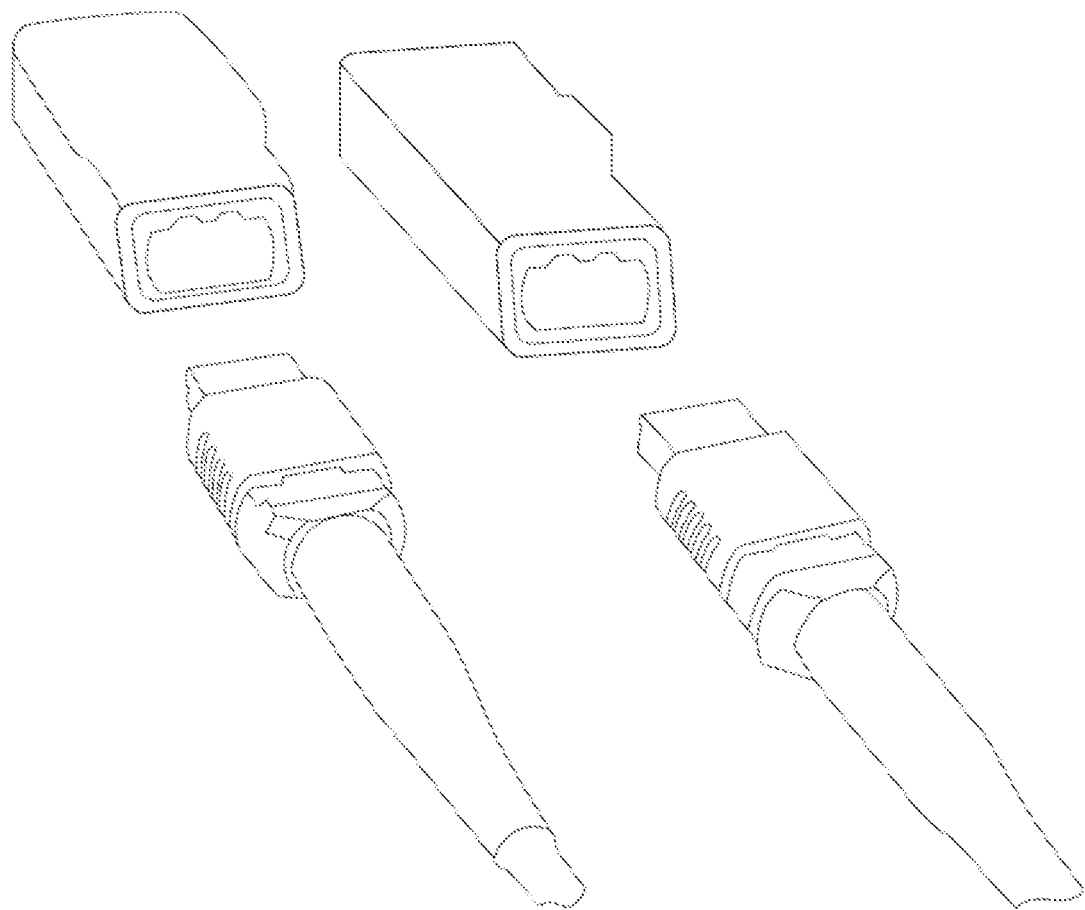
FIG. 12 shows the two electrical connectors and the two optical connectors, according to an exemplary embodiment of the present invention.
Figure 13A:
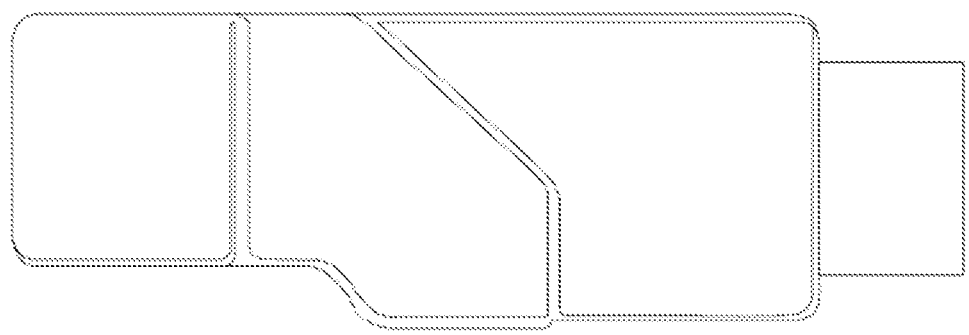
FIG. 13A shows an electrical connector and FIG. 13B shows another electrical connector, according to an exemplary embodiment of the present invention.
Figure 13B:
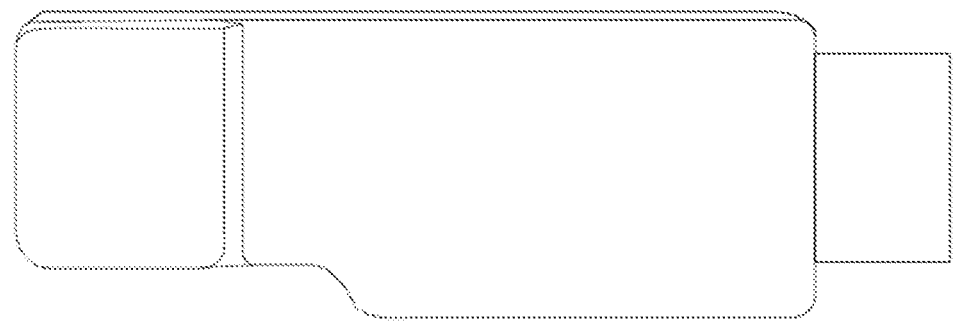
Figure 14A:
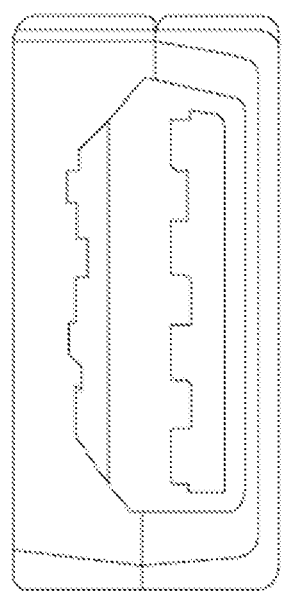
FIG. 14A shows an electrical connector and FIG. 14B shows another electrical connector, according to an exemplary embodiment of the present invention.
Figure 14B:
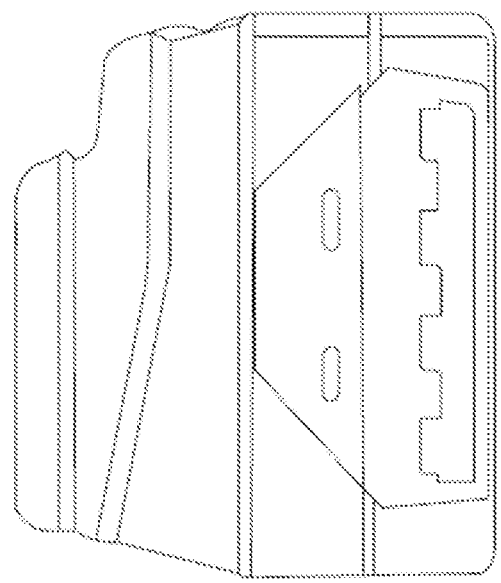
Figure 15A:
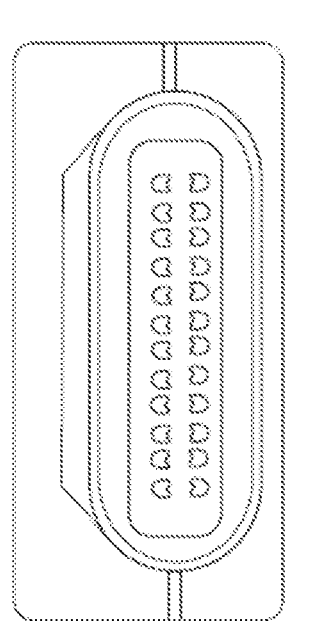
FIG. 15A shows an electrical connector and FIG. 15B shows another electrical connector, wherein the two electrical connectors are having a VGA interface, according to an exemplary embodiment of the present invention.
Figure 15B:
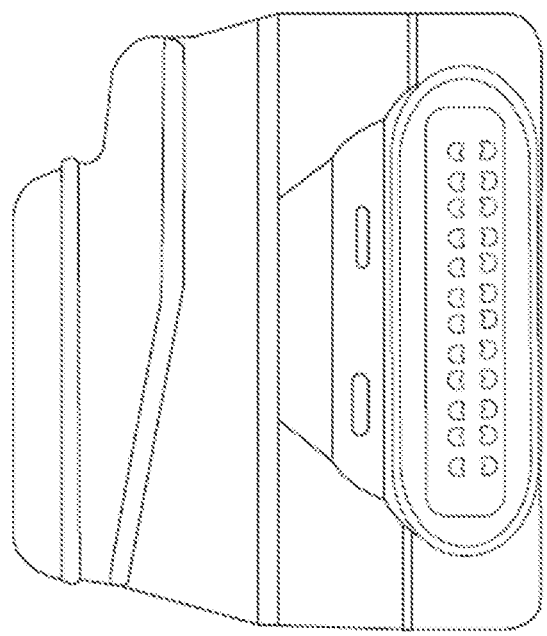
Figure 16A:
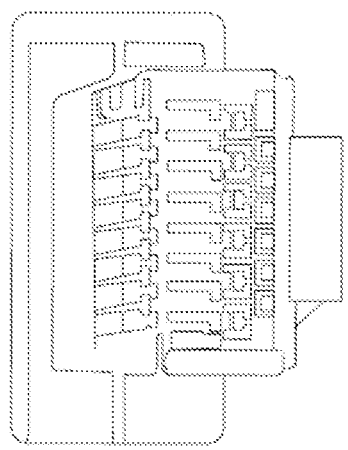
FIG. 16A shows an electrical connector and FIG. 16B shows another electrical connector, according to an exemplary embodiment of the present invention.
Figure 16B:
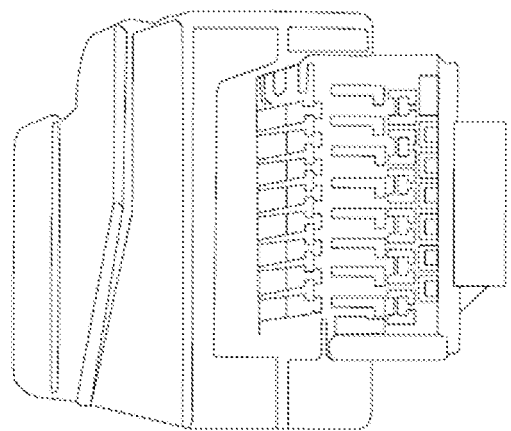
Figure 17A:
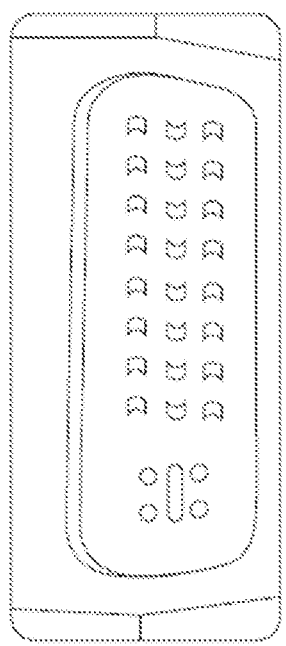
FIG. 17A shows an electrical connector and FIG. 17B shows another electrical connector, wherein both the electrical connectors have a digital video interface according to an exemplary embodiment of the present invention.
Figure 17B:
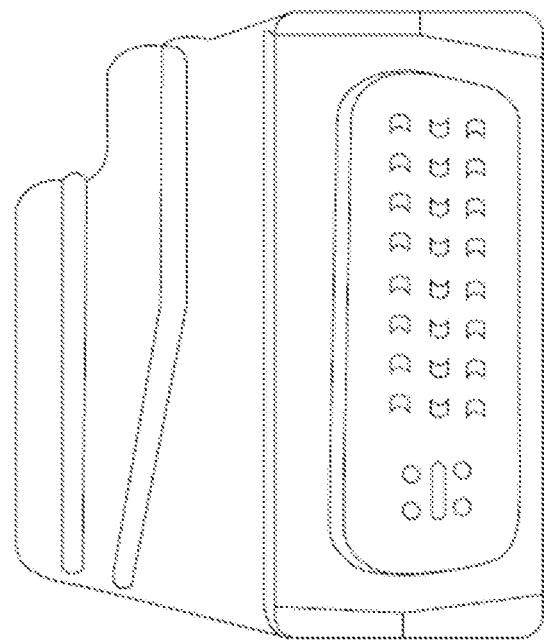
Figure 18A:
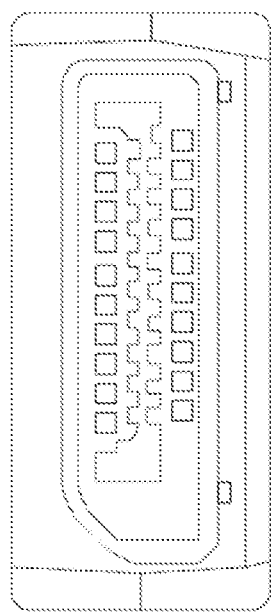
FIG. 18A shows an electrical connector and FIG. 18B shows another electrical connector, wherein both the electrical connectors have a display port interface according to an exemplary embodiment of the present invention.
Figure 18B:
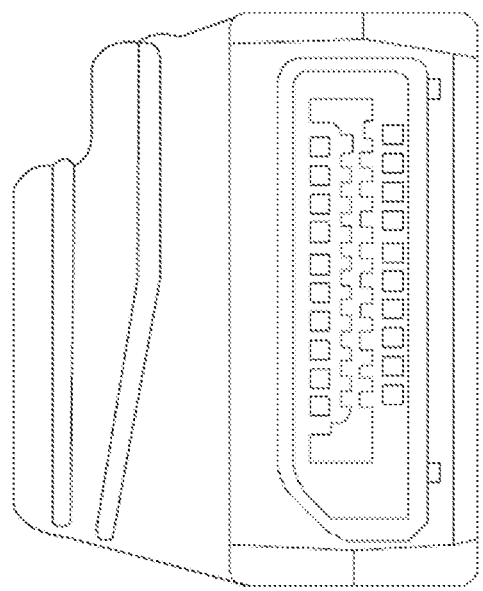
Figure 19A:
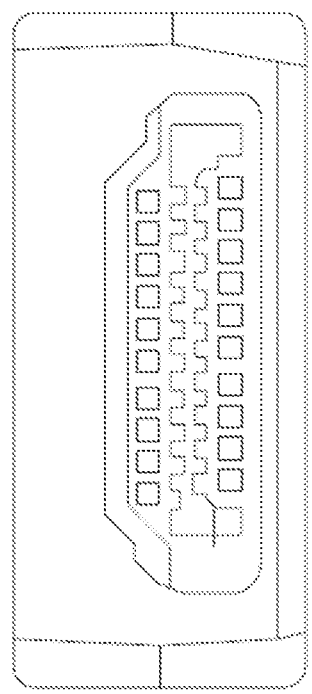
FIG. 19A shows an electrical connector and FIG. 19B shows another electrical connector, wherein both the electrical connectors have a HDMI interface according to an exemplary embodiment of the present invention.
Figure 19B:
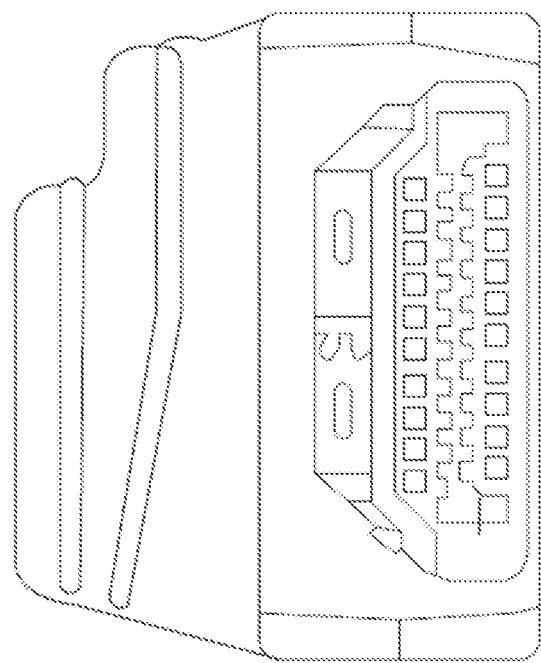
Figure 20A:
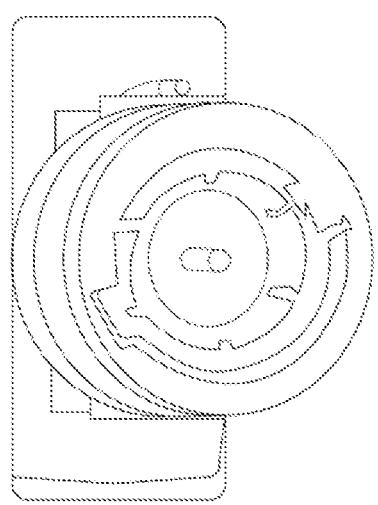
FIG. 20A shows an electrical connector and FIG. 20B shows another electrical connector, wherein both the electrical connectors have a serial digital interface according to an exemplary embodiment of the present invention.
Figure 20B:
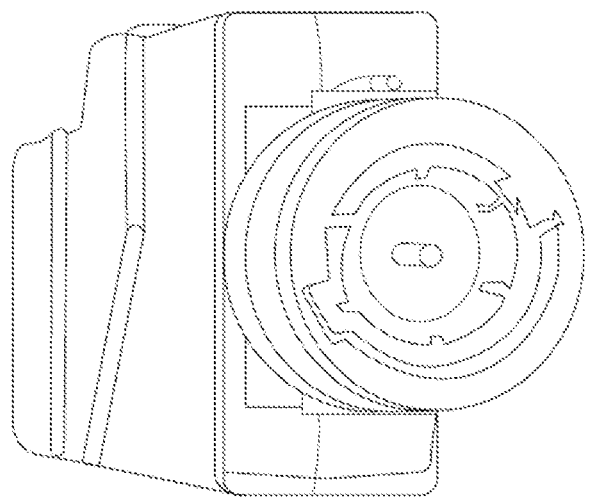

FIG. 3 shows another exemplary embodiment of the multimedia connector cable 300 having the electrical connector 310 connected to the optical connector 320 through the optical cable 330. The electrical connector having a hi-speed USB interface, such as USB-A or USB-C. The USB interface can be having an adaptor to switch the USB interface between a small form factor and a big form factor. The multimedia connector cable 300 can be for a source device. FIG. 4 shows the similar multimedia connector cable 400 for the target device. The multimedia connector cable 400 having the electrical connector 410 connected at one end of the optical cable 420 and the opposite end of the optical cable 420 connected to the optical connector 430. A power cable 440 which is having a USB interface can also be seen extending from the electrical connector 410. It is to be understood that the power cable is preferably for a standard format, such as USB but all types of electrical interfaces are within the scope of the present invention. Also, the electrical connector has been described using the HDMI interface and the USB interface, however, other types of electrical multimedia connectors are within the scope of the present invention. Also, the electrical connector can have both the transmitting circuitry and the receiving circuitry.

In one exemplary embodiment is disclosed a cable assembly having a long optical cable of lengths up to 500 feet or more. Both ends of the long optical cable can have mating optical connectors. At one end of the long optical cable can be removably coupled a first multimedia connector cable having a transmitting circuitry while the other end of the long optical cable can have a second multimedia connector cable having a receiving circuitry. Both the first and second multimedia connector cables are removably coupled to the long optical cable.

In certain embodiments, disclosed is the cable assembly in which the signals such as power and audio that cannot be easily carried by fiber optics, can be carried through copper wires. The fiber optic and the copper can share the same connector or being independent, outside of the electrical connector shell or on a side of it. The cable assembly may or may not have secure lock in system of any form of shape to keep the connections in place.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A multimedia connector cable comprising:
   an optical cable encasing a plurality of optical fibers, the optical cable having a proximal end and a distal end;
   an electrical connector optically connected to the proximal end of the optical cable, the electrical connector having a multimedia interface for electrically connecting to a source device or target device; and
   an optical connector optically connected to the distal end of the optical cable, the optical connector configured to removable and optically connect to a mating optical connector of a long optical cable,
   wherein the electrical connector has a receiving circuitry for converting light signals received through the plurality of optical fibers to electrical signals, the receiving circuitry is powered externally, wherein the multimedia connector cable further comprises a USB cable extending from the receiving circuitry for receiving power through a power source.

2. The multimedia connector cable according to claim 1, wherein the multimedia interface is selected from a group consisting of an HDMI interface, display port interface, serial digital interface, and digital video interface.

3. The multimedia connector cable according to claim 1, wherein the multimedia interface is a hi-speed USB interface.

4. The multimedia connector cable according to claim 3, wherein the hi-speed USB interface is USB-C.

5. The multimedia connector cable according to claim 1, wherein the electrical connector has a transmitting circuitry for converting electrical signals to light signals.

6. The multimedia connector cable according to claim 1, wherein the optical connector is a multi-fiber push-on connector.

7. A cable assembly comprising:
   a long optical cable having a first mating optical connector at a first end and a second mating optical connector at another end;
   a first multimedia connector cable comprising:
      a first short optical cable encasing a plurality of optical fibers, the first short optical cable having a proximal end and a distal end,
      a first electrical connector optically connected to the proximal end of the first short optical cable, the first electrical connector having a first multimedia interface for electrically connecting to a source device, and
      a first optical connector optically connected to the distal end of the first short optical cable, the first optical connector configured to removable and optically connect to the first mating optical connector; and
   a second multimedia connector cable comprising:
      a second short optical cable encasing a plurality of optical fibers, the second short optical cable having a proximal end and a distal end,
      a second electrical connector optically connected to the proximal end of the second short optical cable, the second electrical connector having a second multimedia interface for electrically connecting to a target device, and
      a second optical connector optically connected to the distal end of the second short optical cable, the second optical connector configured to removable and optically connect to the second mating optical connector,
      wherein the second electrical connector has a first receiving circuitry for converting the light signals from the optical cable to electrical signals,
      wherein the first receiving circuitry is powered externally, wherein the second multimedia connector cable further comprises a USB cable extending from the first receiving circuitry for receiving power through a power source.

8. The cable assembly according to claim 7, wherein the first multimedia interface and the second multimedia interface are selected from a group consisting of an HDMI interface, display port interface, serial digital interface, digital video interface, and a combination thereof.

9. The cable assembly according to claim 7, wherein the first multimedia interface and the second multimedia interface are USB interfaces.

10. The cable assembly according to claim 7, wherein the first electrical connector has a first transmitting circuitry for converting electrical signals from the source device to light signals.

11. The cable assembly according to claim 10, wherein the first electrical connector has a second receiving circuitry for converting light signals to electrical signals and the second electrical connector has a second transmitting circuitry for converting electrical signals to the light signals.

12. The cable assembly according to claim 7, wherein the optical connector is a multi-fiber push-on connector.

13. The cable assembly according to claim 7, wherein the first multimedia connector cable and the second multimedia connector cable are short in length than the long optical cable.

14. The cable assembly according to claim 7, wherein the first multimedia connector cable and the second multimedia connector are of the same length.

\* \* \* \* \*